March 23, 1954
R. D. ELDERT
2,672,808
BALER ATTACHMENT
Filed Jan. 31, 1949
3 Sheets-Sheet 1
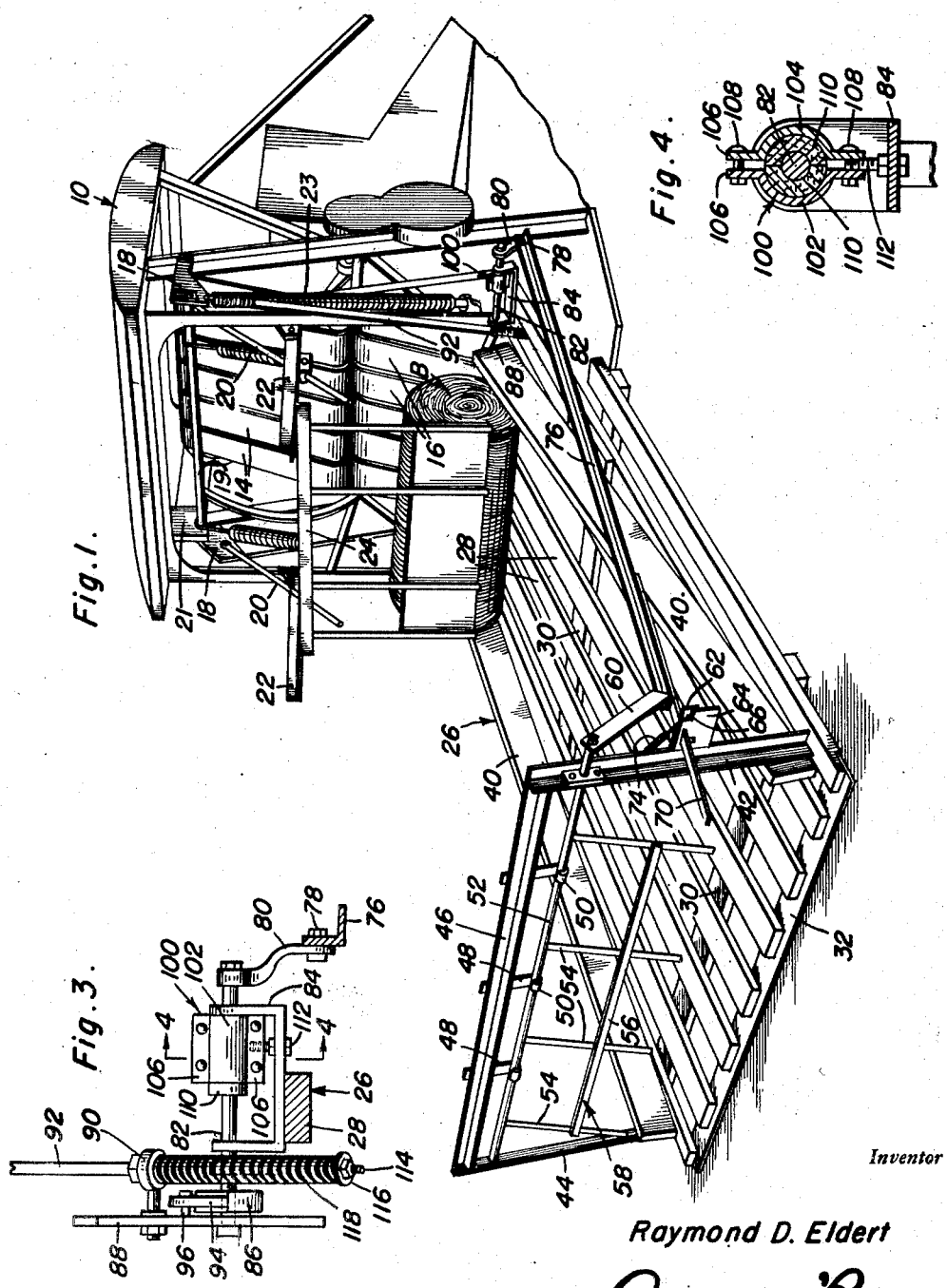
Inventor
Raymond D. Eldert
By Clarence A. O'Brien
and Harvey B. Jacobson
Attorneys March 23, 1954  R. D. ELDERT  2,672,808
BALER ATTACHMENT
Filed Jan. 31, 1949  3 Sheets-Sheet 2
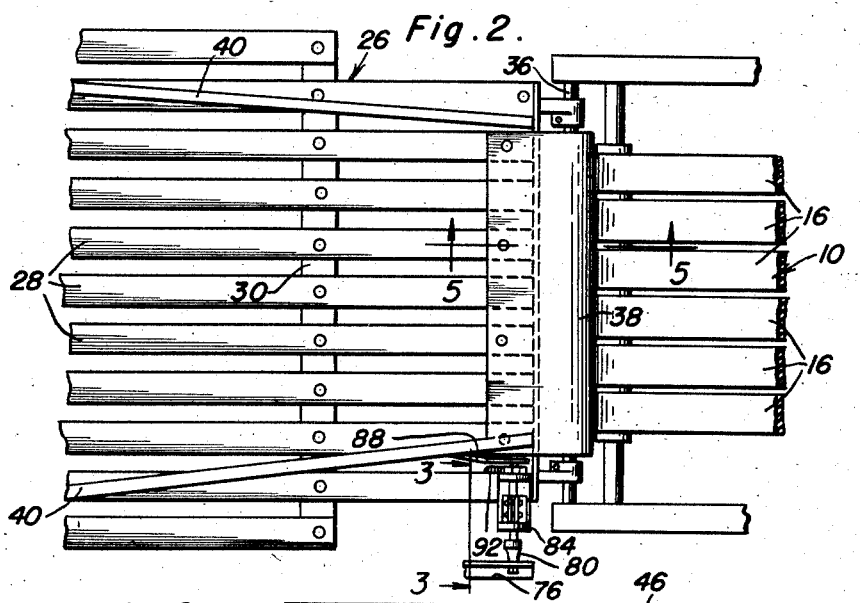
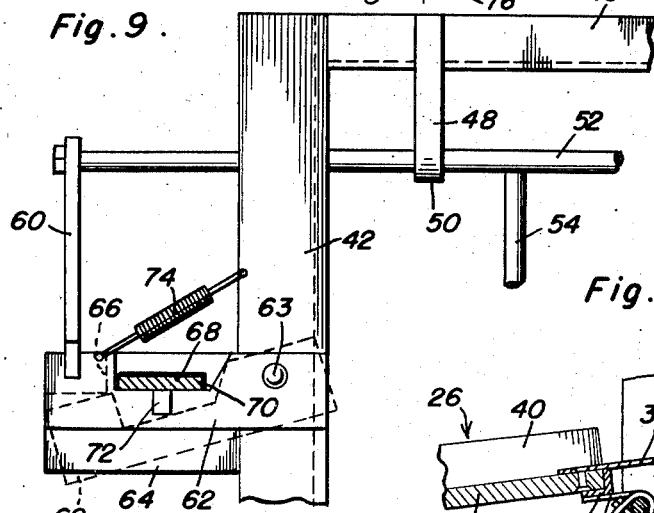
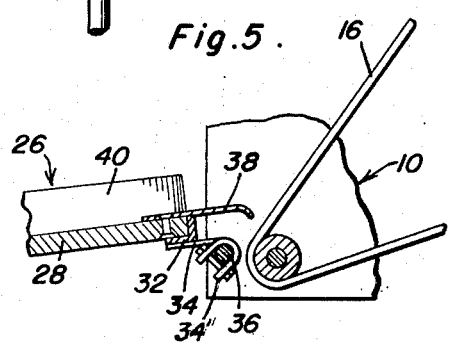
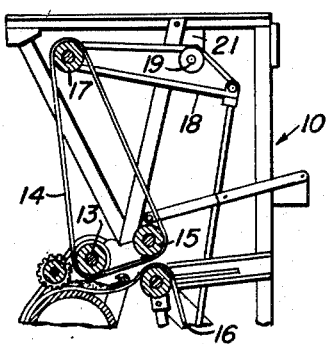
Inventor
Raymond D. Eldert
By *Clarence A. O'Brien and Harvey B. Jacobson*
Attorneys March 23, 1954     R. D. ELDERT     2,672,808
BALER ATTACHMENT
Filed Jan. 31, 1949     3 Sheets—Sheet 3
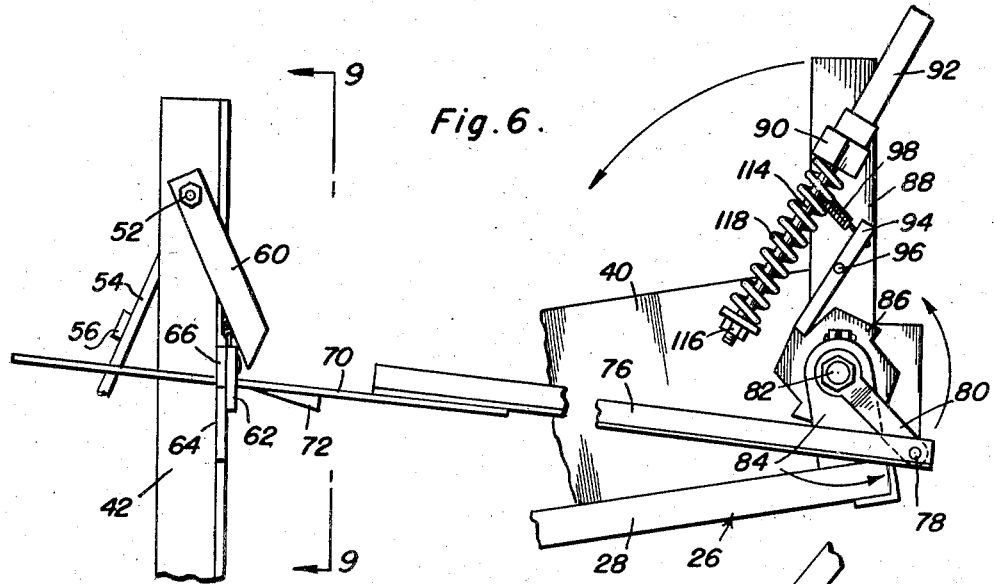
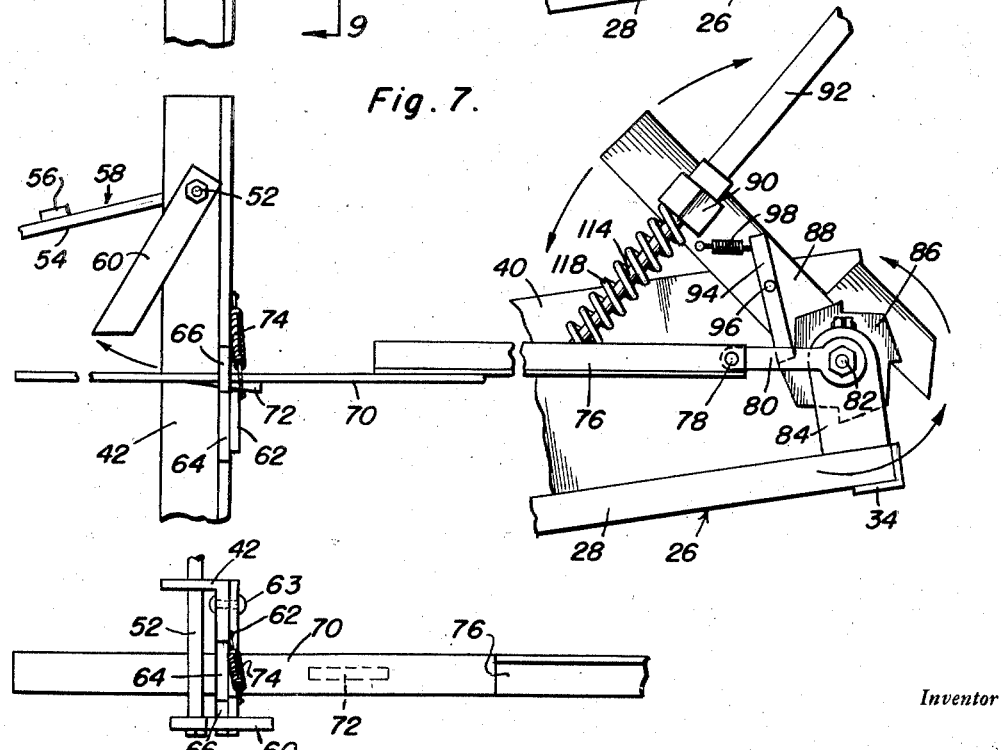
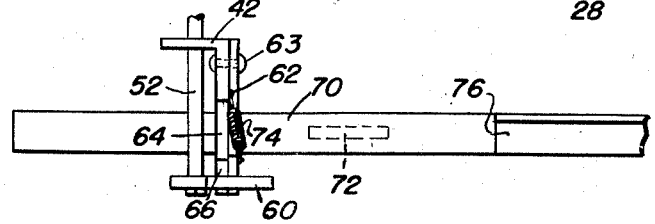
Inventor
Raymond D. Eldert
By *Clarence A. O'Brien and Harvey B. Jacobson*
Attorneys Patented Mar. 23, 1954

2,672,808

UNITED STATES PATENT OFFICE 2,672,808

BALER ATTACHMENT

Raymond D. Eldert, Williamsfield, Ill.

Application January 31, 1949, Serial No. 73,826

9 Claims. (Cl. 100—188)

This invention relates to a baler attachment and more particularly to an attachment for balers of the type having means to roll hay or straw into a succession of substantially circular cylindrical bales or bundles, and from which each bale or bundle is discharged upon the completion thereof.

Balers of the type to which this invention relates have found wide utility in the baling or packaging of materials such as hay, straw or the like, and serve admirably their purpose. Owing to the fact, however, that wide variations occur in the density of the material that is fed to the baler and that the density of a finished bale or bundle determines its time of discharge from the baler it becomes apparent that the discharge of the completed bales or bundles from the baler has been more or less at random. The random discharge of the bales or bundles from the baler necessitates many and irregular stops by the equipment employed to collect the bales deposited in a field by a baler, and as a result much time is consumed in collecting the completed bales for subsequent storage.

The primary object of this invention is to reduce the number of stops necessary to collect bales deposited by such balers in a field.

Another object is to effect economies in the collection of bales or bundles formed by balers of the type above referred to.

A further and more specific object is to enable a group of bales or bundles to be deposited as the baler progresses, thus enabling the bale collector to load a number of bales or bundles at a single stop.

The above and other objects may be attained by employing this invention which embodies among its features an inclined platform which is connected to and slopes downwardly from the bale or bundle forming apparatus and onto the upper portion of which the bales or bundles are deposited as they leave the bale or bundle forming apparatus, a gate carried by the platform adjacent the lower end thereof to arrest downward movement of bales or bundles along said platform and cause them to accumulate on the platform, and means coupled to the bale or bundle forming apparatus and operatively associated with the gate periodically to permit the gate to open under the weight of the bales accumulated on the platform, thus to discharge a group of bales from the baler.

Other features include a latch operatively associated with the gate to retain said gate in bundle obstructing relation to the platform, a latch release member operatively associated with the latch and coupled to a crank arm mounted on the platform near the baler, a ratchet wheel operatively connected with the crank arm for intermittently moving it, and a push rod actuated dog operated in unison with the bale forming apparatus and engaging the ratchet wheel to move said ratchet wheel and crank arm each time a bale is formed by the baler.

In the drawings:

Figure 1 is a perspective view of a fragment of a conventional baler illustrating this attachment in place thereon;

Figure 2 is a fragmentary plan view of the baler attachment showing it operatively coupled to the baler, only portions of said baler being illustrated;

Figure 3 is a fragmentary enlarged sectional view taken substantially along the line 3—3 of Figure 2;

Figure 4 is a sectional view taken substantially along the line 4—4 of Figure 3;

Figure 5 is a fragmentary sectional view taken substantially along the line 5—5 of Figure 2;

Figure 6 is a fragmentary enlarged side view of the gate controlling mechanism, illustrating the gate in latched position;

Figure 7 is a view similar to Figure 6 showing the gate in its unlatched position;

Figure 8 is a fragmentary plan view of the latch and the latch control rod;

Figure 9 is a fragmentary enlarged sectional view taken substantially along the line 9—9 of Figure 6; and Figure 10 is a side view of the baler showing the mounting of the upper belt.

Referring to the drawings in detail, a conventional baler designated generally 10 includes upper and lower groups of bale forming belts 14 and 16, respectively. The belts 14 are entrained around rollers 13, 15 and 17. The roller 13 is mounted in fixed position on the frame of the baler. Roller 15 is capable of forward and upward movement with respect to the roller 13. A shaft 19 is rotatably secured to the frame of the baler adjacent the upper end thereof. The shaft is supported at one end by a bracket 21 and at the other end by one of the brace members of the baler. An arm 18 is fixedly secured to each end of the shaft 19, whereby movement of one arm will cause a like movement of the other arm. The arm 18 at the end of the shaft 19 adjacent the bracket 21 has a forwardly extending portion and a rearwardly extending portion. The roller 17 is secured to the rear end of the rearwardly extending portion of the arm. The other arm 18 has a forwardly extending portion only. A spring 23 is secured between the end of the arm and the baler frame.

The operation of the baler is similar to that shown in Patent No. 2,096,660. As the bale is formed between the belts 14 and 16, the belt 14 will be moved upwardly and at the same time roller 15 will be moved forwardly. As the belt is tightened, due to the deformation of the belt between rollers 13 and 15 and the forward movement of roller 15, roller 17 will be forced downward, thereby moving the rear portion of arm 18 downward. This causes the shaft to rotate and forces the forwardly extending portion of the other arm 18 upwardly against the action of the spring 23. When the roller 15 moves upwardly the bale will be discharged from between the belts 14 and 16 and will allow the belt 14 to slacken. The spring 23 will then return the arms 18 and the roller 17 to their original positions.

In carrying my invention into practice I attach to the lever arms 18 lift fingers 20 which project downwardly and rearwardly from the lever arms 18. A bale or bundle retaining gate 24 is supported on gate supporting arms 22 which are pivotally coupled to the baler to swing in vertical arcs at the rear of the baler, and this gate 24 when lowered obstructs the discharge of a finished bale, retaining it in the baler adjacent the lower group 16 of belts. The lift fingers 20 engage the gate 24, as will be readily understood upon reference to Figure 1, and hence a bale is held in the baler until the next succeeding bale is completed and has lifted the belts 14 ready for it discharge. With the lifting of the belts 14, the arms 18 move upwardly carrying with them the lift fingers 20 and the gate 24 so that the latter will clear the previously formed bale or bundle.

A platform designated generally 26 is composed of a group of slats 28 held together by cross pieces 30 and these slats 28 extend longitudinally of the platform and carry at one end of said platform a ground skid 32. An angle bar 34 joins the opposite ends of the slats 28 and fixed to the angle bar 34 and extending forwardly therefrom are coupling members 34' which are adapted to be connected to a cross member 36 of the baler 10 so that the platform 26 slopes downwardly from the baler immediately below the point of discharge of the finished bundles or bales B from between the belts 14 and 16. A suitable forwardly extending guard plate 38 is secured in any suitable manner to the forward ends of the slats 28 above the couplings 34 and extend forwardly toward the lower ends of the belts 16 to prevent bales or bundles from becoming wedged between the belts and the upper end of the platform 26. Suitable longitudinally extending guides 40 are carried by the upper side of the platform 26 to maintain on the platform bales rolling down the platform toward the skid 32.

Extending upwardly from the platform adjacent its lower rear end, and on opposite sides thereof are standards or columns 42 and 44, the upper ends of which are joined by a horizontal cross bar 46 carrying depending straps 48, the lower ends of which are hooked as at 50 to form supporting members for a horizontally extending bar 52 which is rockably supported in the standards 42 and 44 adjacent the upper ends thereof. This bar 52 is provided at longitudinally spaced points with radially extending tines 54 which project outwardly therefrom and are joined intermediate their ends by a cross member 56 to form together with the bar 52 a gate designated generally 58. As illustrated in Figures 1 and 8, the bar 52 projects through the standard 42 and has fixed to its outer end a latch arm 60 which engages a latch 62 which is pivoted as at 63 to the standard 42 intermediate the ends thereof. This latch 62 and latch arm 60 serve to hold the gate 58 in a substantially vertical position across the lower rear end of the platform 26 to form an obstruction which will prevent bales deposited on the upper end of the platform from being discharged from the lower end thereof. Carried by the standard 42 adjacent the latch 62 is a guide plate 64 having a notch 66 therein which is normally covered by the latch 62, and formed in the guide plate 64 is a guide slot 68 in which is slidably mounted a latch control plate 70 carrying on its underside a wedge 72 which is adapted when the plate is moved toward the rear end of the platform 26 to move the latch 62 downwardly against the effort of an extensible coil spring 74, one end of which is anchored to the latch, while the other end is connected to the standard or column 42.

Fixed to the member 70 and extending longitudinally therefrom alongside of the platform 26 toward the baler 10 is a link 76, and the end of the link 76 remote from the member 70 is rotatably coupled as at 78 to a crank arm 80. This crank arm is carried at one end of a shaft 82 which is mounted for rotation in a suitable bracket 84 carried by the platform 26 adjacent the baler 10. Fixed to the shaft 82 adjacent the end remote from the crank arm 80 is a ratchet wheel 86, and rotatably supported on the shaft 82 adjacent the ratchet wheel 86 is an arm 88 to which is pivotally connected by a suitable coupling 90 one end of a push rod 92, the opposite end of which is pivotally connected to the arm 18 of the baler 10 having the springs 23 secured thereto, so that each time a bale or bundle is discharged from the baler by the upward movement of the group of belts 14, the push rod 92 will be actuated to swing the rock arm 88 about the axis of the shaft 82. A ratchet dog 94 is pivotally coupled to the rock arm 88 as at 96, and is yieldingly held into contact with the periphery of the ratchet wheel by means of a suitable spring 98.

In order to hold the shaft 82 against accidental rotation, a suitable friction member designated generally 100 is mounted on the shaft adjacent the bracket 84, and this friction member comprises two substantially semi-circular plates 102 and 104 each of which is provided along each marginal edge with an outstanding flange 106. These flanges are pierced to receive adjusting bolts 108 by which the members 102 and 104 may be advanced toward one another, and seated in each member 102 and 104 is a suitable friction facing 110 which embraces the shaft 82 under pressure. Obviously, the pressure of the facings 110 may be regulated by adjustment of the bolts 108. In order to hold the friction device 100 against rotation, a suitable pin 112 extends through the bracket 84 into the space between one pair of flanges 106.

In order that the coupling member 90 may be cushioned upon upward movement of the push rod 92, the push rod is provided with a longitudinal extension 114, the end of which remote from the push rod is externally screw-threaded to receive a nut 116, and bearing on the nut is one end of a compression coil spring 118, the opposite end of which bears against the coupling 90, so that when the push rod moves upwardly upon movement of the arm 18, beyond a point at which the lever arm 88 can move upwardly, any excess pull on the push rod 92 will be absorbed by the spring 118.

In use, it will be understood that with the platform 26 coupled as illustrated in Figure 5 to the discharge end of the baler 10, it will slope downwardly as illustrated in Figure 1, so that bales deposited on the upper end of the platform will roll down toward the skid 32. With the gate 58 held in a substantially vertical position by the latch 62, it will be evident that as the bales are released by the gate 24, the bales or bundles B will collect on the platform 26 in front of the gate 58. As the bales are formed in the baler 10, and attain a predetermined size, the belts 14 will be swung upwardly, thus causing the arms 18 to move and consequently lift the push rod 92 and cause the ratchet dog 94 to ride over the surface of the ratchet wheel 86 into a position to engage behind a ratchet tooth. Upon downward movement of the arms 18 with the discharge of a bale from between the belts of the baler, the dog 94 will cause the ratchet wheel 86 to rotate, thereby rotating the shaft 82 and crank arm 80 a part of a revolution. With the wedge 72 properly located in connection with the latch 62, it will be obvious that when the crank arm 80 has made a complete revolution, the latch 62 will be depressed against the effort of the spring 74, thus permitting the latch arm 60 to pass through the recess 66 in the plate 64 and hence the gate 58 will be free to swing upwardly about the axis of the bar 52, so that bales or bundles collected on the platform 26 between the gate 58 and the baler 10 will be permitted to roll off of the lower end of the platform so as to be discharged in a group. With the next movement of the arm 80, the wedge 72 will be disengaged from the latch 62, and with the discharge of the bales from the platform 26, the gate 58 will swing by gravity into its original vertical position, thus causing the latch arm 60 to latch behind the latch 62 so that the gate will be in obstructing relation with the discharge end of the platform 26.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In apparatus for successively forming substantially circular cylindrical bales of hay, straw or the like and from which said bales are discharged in succession as they are formed, said apparatus including vertically swingable spring loaded lever arms, means for collecting the successively discharged bales into groups and for successively depositing said groups of bales onto the ground, said means comprising an inclined platform which is connected to and slopes downwardly from the bale forming apparatus and onto the upper portion of which the bales are deposited as they leave the bale forming apparatus, a gate carried by the platform adjacent the lower end thereof to arrest downward movement of the bales and cause them to accumulate on the platform, and means coupled to the lever arms of the bale forming apparatus and operatively associated with the gate to periodically permit the gate to open under the weight of the bales accumulated on the platform.

2. In apparatus for successively forming substantially circular cylindrical bales of hay, straw or the like and from which said bales are discharged in succession as they are formed, said apparatus including vertically swingable spring loaded levers, means for collecting the successively discharged bales into groups and for successively depositing said groups of bales onto the ground, said means comprising an inclined platform which is connected to and slopes downwardly from the bale forming apparatus and onto the upper portion of which the bales are deposited as they leave the bale forming apparatus, a gate mounted on the platform adjacent the lower end thereof to swing about a horizontal axis above said platform and arrest downward movement of the bales, thereby to accumulate a group of bales on the platform, a latch to hold said gate closed, and means operatively associated with the latch and coupled to the levers of the bale forming apparatus to periodically release the latch and allow the gate to swing about the horizontal axis under the weight of the bales accumulated on the platform.

3. In baling apparatus of the type in which hay or straw is rolled into a succession of substantially circular cylindrical bales from which said bales are discharged in succession as they are formed, said apparatus including vertically swingable spring loaded levers, means for collecting the completed bales into groups and periodically depositing said groups of bales onto the ground, said means comprising an inclined platform which is connected to and slopes downwardly from the bale forming apparatus, bale straightening and retaining means carried adjacent the upper end of the platform connected to said levers and operable to release onto the upper end of the platform a retained bale as the next succeeding bale is completed, a gate carried by the platform adjacent the lower end thereof for arresting movement of the bales along said platform and accumulating a group of such bales on the platform, and means operatively associated with the gate and coupled to the levers of the baling apparatus, bale retaining means to periodically permit the gate to open under the weight of the group of bales accumulated on the platform.

4. In baling apparatus of the type in which hay or straw is rolled into a succession of substantially circular cylindrical bales and from which the bales are discharged as they are formed, means for collecting the completed bales into groups and periodically depositing said groups of bales onto the ground, said means comprising an inclined platform which is connected to and slopes downwardly from the bale forming apparatus, bale retaining means carried adjacent the upper end of the platform and operable to release onto the upper end of the platform a retained bale as the next succeeding bale is completed, a gate carried by the platform adjacent the lower end thereof for arresting movement of the bales along said platform and accumulating a group of such bales on the platform, a ratchet wheel carried by the platform, a push rod connected to the bale retaining means and actuating the ratchet wheel, an arm operated by the ratchet wheel, and means connected to the arm and operatively associated with the gate to release said gate in timed relation to the movements of the bale retaining means and allow said gate to open under the weight of the bales accumulated on the platform.

5. In baling apparatus of the type in which hay or straw is rolled into a succession of substantially circular cylindrical bales and from which the bales are discharged as they are formed, means for collecting the completed bales into groups and periodically depositing said groups of bales onto the ground, said means comprising an inclined platform which is connected to and slopes downwardly from the bale forming apparatus, bale straightening and retaining means carried adjacent the upper end of the platform and operable to release onto the upper end of the platform a retained and straightened bale as the next succeeding bale is completed, a gate carried by the platform adjacent the lower end thereof for arresting movement of the bales along said platform and accumulating a group of such bales on the platform, a shaft mounted on the platform adjacent the upper end thereof to rotate about a horizontal axis, a ratchet wheel fixed to said shaft, a push rod coupled at one end to the bale retaining means, a ratchet dog carried by the push rod and operating on the ratchet wheel to rotate the shaft in timed relation with the movements of the bale retaining means, and means actuated by the shaft and operatively associated with the gate to periodically permit the gate to open under the weight of the bales accumulated on the platform.

6. In baling apparatus of the type in which hay or straw is rolled into a succession of substantially circular cylindrical bales and from which the bales are discharged as they are formed, said apparatus including a pair of vertically swingable spring loaded levers, means for collecting the completed bales into groups and periodically depositing said groups of bales onto the ground, said means comprising an inclined platform which is connected to and slopes downwardly from the bale forming apparatus, bale straightening and retaining means carried adjacent the upper end of the platform and connected to said levers, said straightening and retaining means being operable to release onto the upper end of the platform a retained and straightened bale as the next succeeding bale is completed and as the levers are raised, a gate mounted above the platform adjacent the rear end thereof to swing about a horizontal axis, a latch arm carried by the gate, a latch carried by the platform in cooperative relation to the latch arm to hold the gate substantially vertical and arrest movement of bales rolling down the platform so as to cause them to accumulate in a group on the platform, and means coupled to the bale retaining means and operating the latch to periodically release said latch and permit the gate to open under the weight of the bales accumulated on the platform.

7. In a bale forming apparatus including an upwardly swingable upper group of belts, a lower group of belts and a vertically swingable member operatively connected to the upper group of belts and swingable upwardly with the upper group of belts, a platform extending downwardly and rearwardly from the groups of belts, a vertically swingable closure supported by the platform at the rear end of the latter, a latch retaining the closure in its closed position, a latch releasing mechanism for engaging and releasing the latch, and means operatively connecting said latch releasing mechanism to said vertically swingable member for actuation of the latch releasing mechanism to its latch releasing position during raising of the member and the upper group of belts.

8. The combination of claim 7 wherein said latch releasing mechanism includes a sliding wedge.

9. In a bale forming apparatus including an upwardly swingable upper group of belts, a lower group of belts and a vertically swingable member operatively connected to the upper group of belts and swingable upwardly with the upper group of belts, a platform extending downwardly and rearwardly from the groups of belts, a vertically swingable closure supported by the platform at the rear end of the latter, a latch retaining the closure in its closed position, a latch releasing mechanism for engaging and releasing the latch, and means operatively connecting said latch releasing mechanism to said vertically swingable member for actuation of the latch releasing mechanism to its latch releasing position during raising of the member and the upper group of belts, said last named means including a rotatable shaft, said latch releasing mechanism including a crank attached to the shaft, and said connecting means comprising a ratchet on said shaft and a pawl engaging the ratchet and connected to said member.

RAYMOND D. ELDERT.

References Cited in the file of this patent
UNITED STATES PATENTS

| Number | Name | Date |
|---|---|---|
| 799,175 | Luebben | Sept. 12, 1905 |
| 862,105 | Reagan | July 30, 1907 |
| 2,316,435 | James | Apr. 13, 1943 |
| 2,336,491 | Luebben | Dec. 14, 1943 |
| 2,386,943 | Fourness | Oct. 16, 1945 |
| 2,453,384 | Renken | Nov. 9, 1948 |